United States Patent

Suermann

(10) Patent No.: US 6,753,045 B2
(45) Date of Patent: Jun. 22, 2004

(54) TN AND STN LIQUID-CRYSTAL DISPLAYS

(75) Inventor: Juliane Suermann, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 26 days.

(21) Appl. No.: 10/180,073

(22) Filed: Jun. 27, 2002

(65) Prior Publication Data
US 2003/0104143 A1 Jun. 5, 2003

(30) Foreign Application Priority Data

Jun. 28, 2001 (DE) .......................................... 101 31 238

(51) Int. Cl.$^7$ ........................ C09K 19/34; C09K 19/30; C09K 19/20; G02F 1/1333

(52) U.S. Cl. .............. 428/1.1; 252/299.61; 252/299.63; 252/299.66; 252/299.67; 349/179

(58) Field of Search ........................ 252/299.61, 299.63, 252/299.66, 299.67; 428/1.1; 349/179

(56) References Cited

U.S. PATENT DOCUMENTS

| | | | |
|---|---|---|---|
| 5,030,382 A | 7/1991 | Yamada | |
| 5,582,767 A | 12/1996 | Buchecker et al. | |
| 6,080,451 A | 6/2000 | Hirschmann et al. | |
| 6,440,506 B1 * | 8/2002 | Kojima et al. | 428/1.1 |
| 6,582,782 B2 * | 6/2003 | Heckmeier et al. | 428/1.1 |

FOREIGN PATENT DOCUMENTS

| | | |
|---|---|---|
| DE | 19720295 | 12/1997 |
| DE | 19844321 | 4/1999 |
| DE | 19914373 | 12/1999 |
| DE | 10000870 | 7/2000 |
| EP | 0 390 329 | 10/1990 |
| EP | 0 598 354 | 5/1994 |
| WO | 0112751 | 2/2001 |

* cited by examiner

Primary Examiner—Shean C. Wu
(74) Attorney, Agent, or Firm—Millen White Zelano & Branigan, P.C.

(57) ABSTRACT

The invention relates to TN and STN liquid-crystal displays and to the novel nematic liquid-crystal mixtures used therein, characterized in that they comprise one or more compounds of the formula I

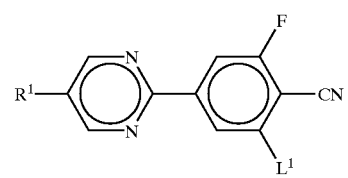

and at least one compound of the formula II

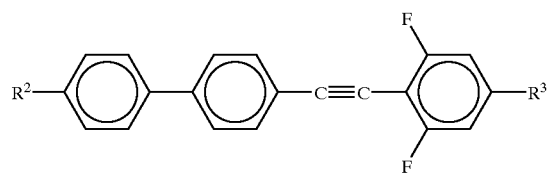

and at least one compound of the formula III

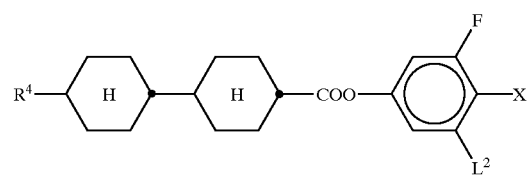

in which $R^1$, $R^2$, $R^3$, $R^4$, $L^1$, $L^2$ and X are as defined in claim 1.

13 Claims, No Drawings

TN AND STN LIQUID-CRYSTAL DISPLAYS

The invention relates to twisted nematic (TN) and supertwisted nematic (STN) liquid-crystal displays having very short response times and good steepnesses and angle dependencies, and to the novel nematic liquid-crystal mixtures used therein.

TN displays are known, for example from M. Schadt and W. Helfrich, Appl. Phys. Lett., 18,127 (1971). STN displays are known, for example from EP 0 131 216 B1; DE 34 23 993 A1; EP 0 098 070 A2; M. Schadt and F. Leenhouts, 17th Freiburg Congress on Liquid Crystals (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No.11, L 1784–L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp.1–8 (1986). The term STN here covers any relatively highly twisted display element having a twist angle with a value of between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Left. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

STN displays are distinguished compared with standard TN displays by significantly better steepnesses of the electro-optical characteristic line and, at moderate and relatively high multiplex rates, for example from 32 to 64 or higher, by better contrast values. On the other hand, the contrast in TN displays is generally higher owing to the better dark value and the angle dependence of the contrast is less than in STN displays with low multiplex rates of, for example, less than 16.

Of particular interest are TN and STN displays having very short response times, in particular also at relatively low temperatures. In order to achieve short response times, the rotational viscosities of the liquid-crystal mixtures have hitherto been optimised using mostly monotropic additives having relatively high vapor pressure. However, the response times achieved were not adequate for every application.

In order to achieve a steep electro-optical characteristic line in the displays according to the invention, the liquid-crystal mixtures should have relatively large values for the ratio between the elastic constants $K_{33}/K_{11}$ and relatively small values for $\Delta\epsilon/\epsilon_{195}$, where $\Delta\epsilon$ is the dielectric anisotropy and $\epsilon_\perp$ is the dielectric constant perpendicular to the longitudinal molecular axis.

In addition to optimisation of the contrast and response times, further important requirements are made of mixtures of this type:

1. broad d/p window
2. high long-term chemical stability
3. high electrical resistance
4. low frequency and temperature dependence of the threshold voltage.

The parameter combinations achieved are still far from adequate, in particular for high-multiplex STN displays (with a multiplex rate of greater than or equal to about 1/128), but also for medium- and low-multiplex STN displays (with multiplex rates in the region of about 1/64 and 1/16 respectively), and TN displays. This is partly attributable to the fact that the various requirements are affected in opposite manners by material parameters.

Thus, there continues to be a great demand for TN and STN displays, in particular for medium- and low-multiplex STN displays, having very short response times at the same time as a large working-temperature range, high characteristic-line steepness, good angle dependence of the contrast and low threshold voltage which meet the above-mentioned requirements.

The invention has the object of providing TN and STN displays which do not have the above-mentioned disadvantages or only do so to a lesser extent and at the same time have short response times, in particular at low temperatures, and/or good steepnesses and improved temperature dependence of the operating voltage and/or good angle dependences of the contrast.

It has now been found that this object can be achieved if use is made of nematic liquid-crystal mixtures which comprise one or more compounds of the formula I

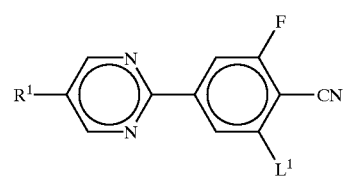

in which $R^1$ is H or an alkyl group having from 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, and $L^1$ is H or F, and at least one compound of the formula II

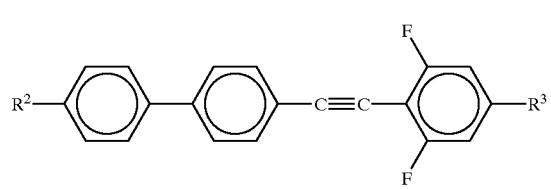

in which $R^2$ and $R^3$, independently of one another, are H, halogen, —CN, —NCS, —$SF_5$ or an alkyl group having from 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, and/or in which, in addition, one or more H atoms may be replaced by halogen and/or —CN, and at least one compound of the formula III

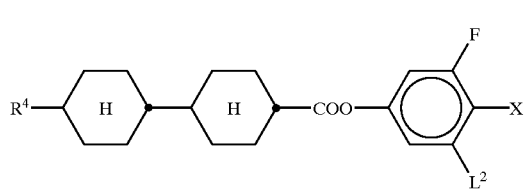

in which
L² is H or F,
X is —F, —Cl, —OCF₃, —OCHF₂, —OCHFCF₃ or —OCF₂CHFCF₃, and
R⁴ independently has one of the meanings indicated for R¹.

The use of the compounds of the formulae I, II and III in the mixtures for TN and STN displays according to the invention results in
  low frequency dependence of the dielectric constants,
  low temperature dependence of the operating voltage and threshold voltage,
  fast response times, in particular at low temperatures, and
  good angle dependence of the contrast.

The said compounds in the mixtures according to the invention significantly shorten, in particular, the response times of TN and STN mixtures, in particular at low temperatures, while simultaneously increasing the steepness and reducing the temperature dependence of the threshold voltage, especially at temperatures between −20 and +20° C.

The mixtures according to the invention are furthermore distinguished by the following advantages:
  they have low viscosity,
  they have a low threshold voltage and operating voltage, and
  they effect long shelf lives in the LC display at low temperatures.

The invention thus relates to a liquid-crystal display having
  two outer plates, which, together with a frame, form a cell,
  a nematic liquid-crystal mixture of positive dielectric anisotropy located in the cell,
  electrode layers with alignment layers on the insides of the outer plates,
  a tilt angle between the longitudinal axis of the molecules at the surface of the outer plates and the outer plates of from 0 degree to 30 degrees, and
  a twist angle of the liquid-crystal mixture in the cell from alignment layer to alignment layer with a value of between 22.5° and 600°,
  a nematic liquid-crystal mixture comprising
    a) 15–80% by weight of a liquid-crystalline component A consisting of one or more compounds having a dielectric anisotropy of greater than +1.5;
    b) 20–85% by weight of a liquid-crystalline component B consisting of one or more compounds having a dielectric anisotropy of between −1.5 and +1.5;
    c) 0–20% by weight of a liquid-crystalline component D consisting of one or more compounds having a dielectric anisotropy of below −1.5, and
    d) if desired, an optically active component C in such an amount that the ratio between the layer thickness (separation of the outer plates) and the natural pitch of the chiral nematic liquid-crystal mixture is from about 0.2 to 1.3, characterized in that component A is a mixture of at least one compound of the formula I

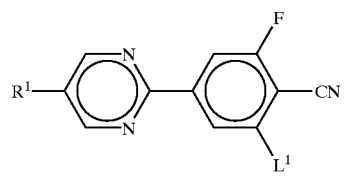

in which
R¹ is H or an alkyl group having from 1 to 12 carbon atoms, in which, in addition, one or two non-adjacent CH₂ groups may be replaced by —O—, —CH=CH—, —CO—, —OCO— or —COO— in such a way that O atoms are not linked directly to one another, and
L¹ is H or F,
and at least one compound of the formula II

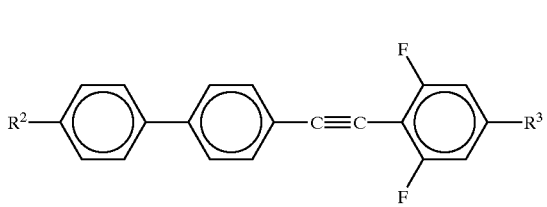

in which
R² and R³, independently of one another, are H, halogen, —CN, —NCS, —SF₅ or an alkyl group having from 1 to 12 carbon atoms, in which, in addition, one or two non-adjacent CH₂ groups may be replaced by —O—, —CH=CH—, —CO—, —OCO— or —COO— in such a way that O atoms are not linked directly to one another, and/or in which, in addition, one or more H atoms may be replaced by halogen and/or —CN,
and at least one compound of the formula III

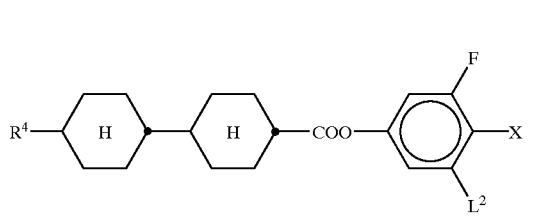

in which
L² is H or F,
X is —F, —Cl, —OCF₃, —OCHF₂, —OCHFCF₃ or —OCF₂CHFCF₃, and
R⁴ has one of the meanings indicated for R¹.

The invention also relates to corresponding liquid-crystal mixtures for use in TN and STN displays, in particular in medium- and low-multiplexed STN displays.

Preference is given to liquid-crystal mixtures which comprise one or more compounds of each of the formulae I, II and/or III in which R¹, R², R³ and/or R⁴, independently of one another, are an alkyl, alkoxy, alkenyl and/or alkenyloxy group having from 1 to 12 carbon atoms.

Particular preference is given to liquid-crystal mixtures which comprise one or more compounds of each of the formulae I, II and/or III in which $R^1$, $R^2$, $R^3$ and/or $R^4$ are straight-chain alkyl having from 1 to 8 carbon atoms and/or $L^1$, $L^2$ and/or X are F.

The use of compounds of the formulae I, II and III in the liquid-crystal mixtures according to the invention results in low values of the rotational viscosity and in TN and STN displays having high steepness and fast response times, in particular at low temperatures.

Pyrimidine derivatives of the formula I are known in principle from EP 0 390 329 A1. Tolan derivatives of the formula 11 are described in EP 0 598 354 A1. Furthermore, liquid-crystal mixtures comprising tolan derivatives of this type are disclosed in WO 01/12751 A1, DE 199 14 373 A1 and DE 198 44 321 A1. The use of compounds of the formula III in liquid-crystal mixtures has also been disclosed, for example in DE 197 20 295 A1 and DE 100 00 870 A1.

Besides the compounds of the formulae I, II and III, the mixtures according to the invention preferably comprise one or more alkenyl compounds of the formula IV

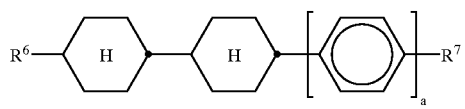

in which $R^6$ is an alkenyl group having from 2 to 12 carbon atoms, in which, in addition, one or more H atoms may be replaced by halogen and/or —CN, $R^7$ is H, halogen, —CN, —NCS, —SF$_5$ or an alkyl group having from 1 to 12 carbon atoms, in which, in addition, one or two non-adjacent CH$_2$ groups may be replaced by —O—, —CH=CH—, —CO—, —OCO— or —COO— in such a way that O atoms are not linked directly to one another, and/or in which, in addition, one or more H atoms may be replaced by halogen and/or —CN, and a is 0 or 1.

Particularly preferred compounds of the formula IV are selected from the formulae IVa to IVg

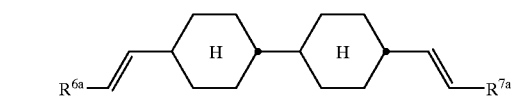

IVa

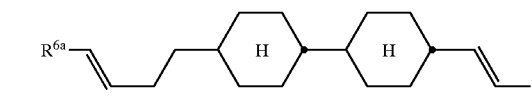

IVb

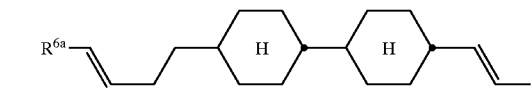

IVc

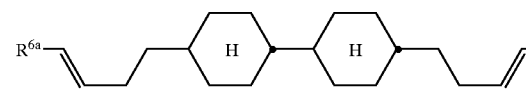

IVd

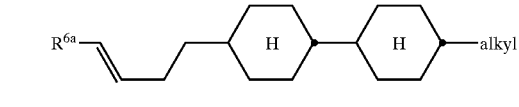

IVe

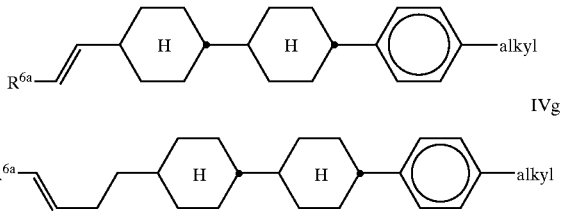

IVf

IVg in which $R^{6a}$ and $R^{7a}$ are each, independently of one another, H, CH$_3$, C$_2$H$_5$ or n-C$_3$H$_7$, and alkyl is an alkyl group having from 1 to 8 carbon atoms.

Particular preference is given to compounds of the formulae IVe and IVf, in particular those in which $R^{6a}$ is H or CH$_3$.

The use of compounds of the formula IV in the liquid-crystal mixtures according to the invention results in particularly low values of the rotational viscosity and in TN and STN displays having high steepness and fast response times, in particular at low temperatures.

Besides the dielectrically neutral alkenyl compounds of the formula IV, the mixtures according to the invention preferably comprise one or more dielectrically positive alkenyl compounds of the formula IV*

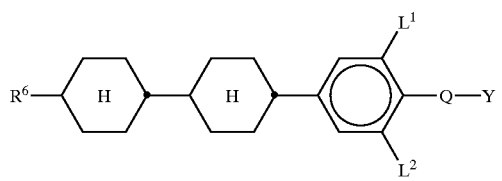

IV* in which $R^6$ is an alkenyl group having from 2 to 7 carbon atoms,

Q is CF$_2$, OCF$_2$, CFH, OCFH or a single bond,

Y is F or Cl, and $L^1$ and $L^2$ are each, independently of one another, H or F.

Particularly preferred compounds of the formula IV* are those in which $L^1$ and/or $L^2$ are F, and Q-Y is F or OCF$_3$.

Preference is furthermore given to compounds of the formula IV* in which $R^6$ is 1E-alkenyl or 3E-alkenyl having from 2 to 7, in particular 2, 3 or 4, carbon atoms.

The polar compounds of the formula IV* having a dielectric anisotropy of greater than +1.5 should be assigned to the above-defined component A.

Component A preferably comprises one or more cyano compounds of the following formulae:

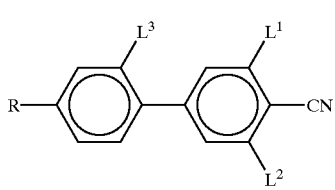

Va

-continued

Vb: [structure with R–H–phenyl(L¹,L²)–CN]

Vc: [structure with R–phenyl–COO–phenyl(L¹,L²)–CN]

Vd: [structure with R–H–COO–phenyl(L¹,L²)–CN]

Ve: [structure with R–H–CH₂CH₂–phenyl(L¹,L²)–CN]

Vf: [structure with R–H–phenyl–COO–phenyl(L¹,L²)–CN]

Vg: [structure with R–phenyl–phenyl–phenyl(L¹,L²)–CN]

Vh: [structure with R–H–H–COO–phenyl(L¹,L²)–CN]

in which
R is an alkyl, alkoxy or alkenyl group having from 1 to 12 carbon atoms, in which, in addition, one or two non-adjacent $CH_2$ groups may be replaced by —O—, —CH=CH—, —CO—, —OCO— or —COO— in such a way that O atoms are not linked directly to one another, and $L^1$ to $L^3$ are each, independently of one another, H or F.

R in these compounds is particularly preferably alkyl or alkoxy having from 1 to 8 carbon atoms or alkenyl having from 2 to 7 carbon atoms.

Particular preference is given to mixtures comprising one or more compounds of the formula Vb and/or Vc, furthermore Vf, in particular those in which $L^1$ and/or $L^2$ are F.

Particular preference is given to compounds of the following formulae:

Vb-1: [alkyl–H–phenyl(F,F)–CN]

Vc-1: [alkyl–phenyl–COO–phenyl(F,L²)–CN]

in which alkyl is an alkyl group having from 1 to 8 carbon atoms, and $L^2$ is H or F, preferably H.

In a specific embodiment, component A preferably comprises one or more 3,4,5-trifluorophenyl compounds of the following formulae:

VIa: [R–H–phenyl(F,F)–phenyl(F,F,F)]

VIb: [R–H–H–phenyl(F,F,F)]

VIc: [R–H–phenyl–phenyl(F,F,F)]

VId: [R–H–phenyl(F,F)–phenyl(F,F,F)]

VIe: [R–H–phenyl(F,F)–CF₂O–phenyl(F,F,F)]

VIf
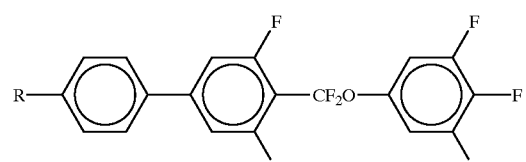
VIg
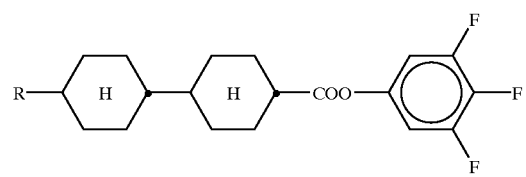
VIh
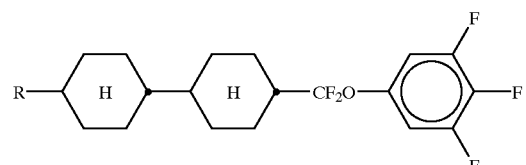
VIi
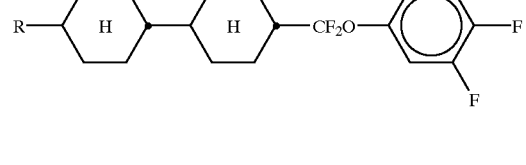
VIk
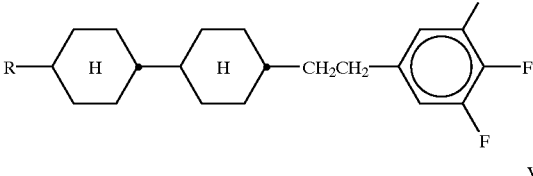
VIm
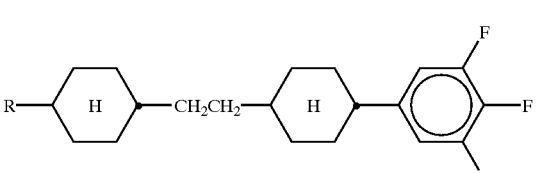
VIn
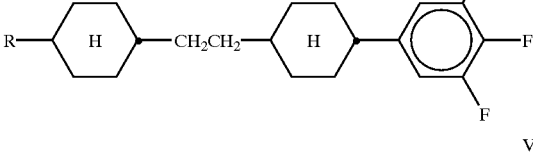
VIo
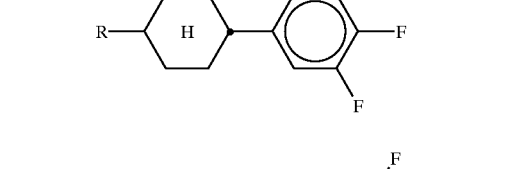
VIp
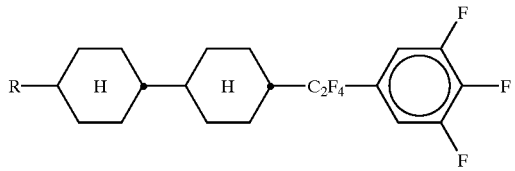
VIq
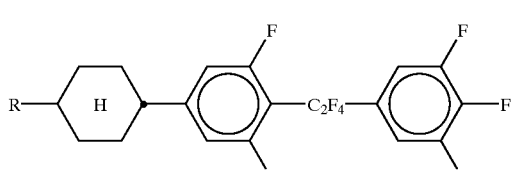
VIr
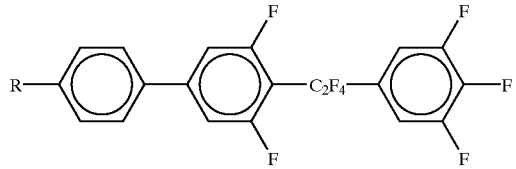
VIs
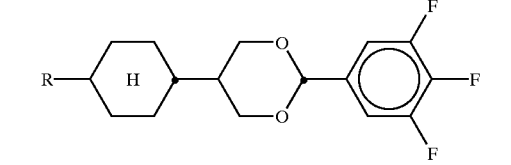
and optionally one or more compounds containing polar end groups of the following formulae:
VIIa
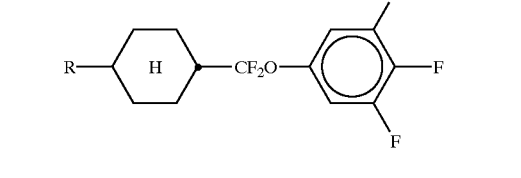
VIIb
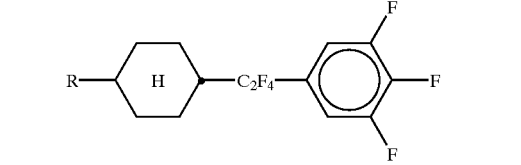
VIIc
VIId
VIIe

VIIf
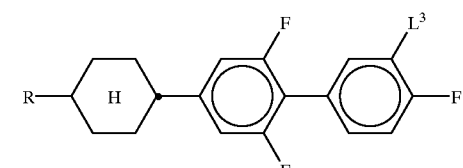

VIIg
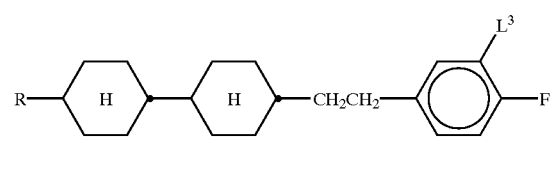

VIIh
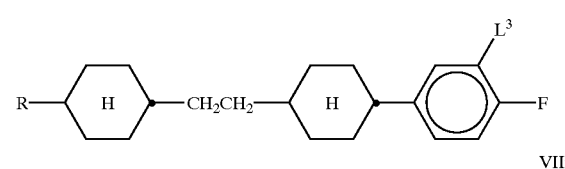

VIIi
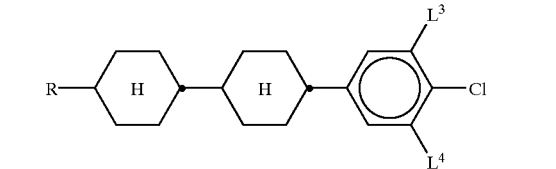

VIIj
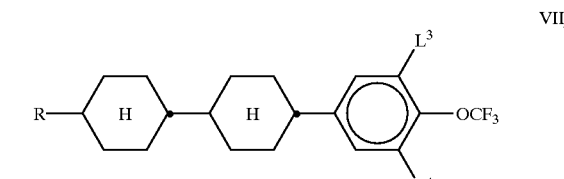

VIIk
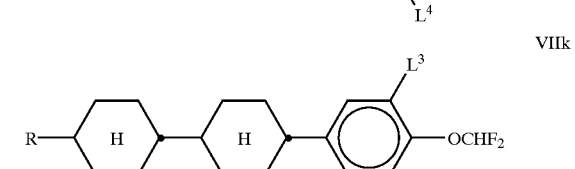

VIIm

VIIn
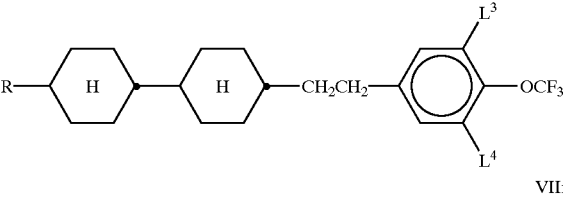

VIIo
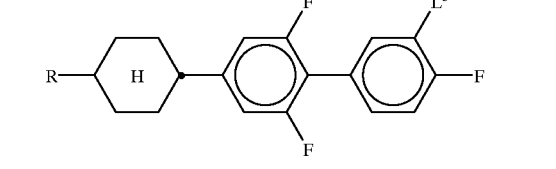

VIIp
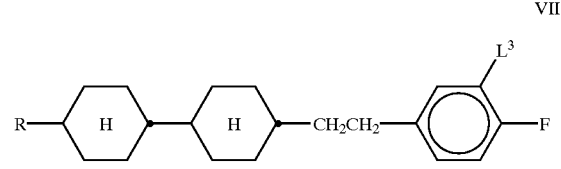

VIIq

VIIr
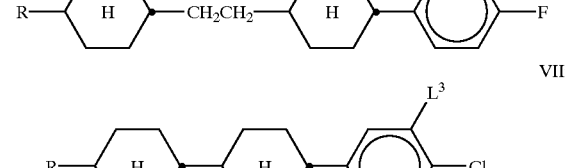

VIIs
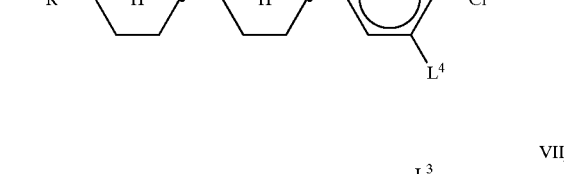

in which R is as defined above, and $L^3$ and $L^4$ are each, independently of one another, H or F. R in these compounds is particularly preferably alkyl or alkoxy having from 1 to 8 carbon atoms or alkenyl having from 2 to 7 carbon atoms.

Particular preference is given to compounds of the formulae VIIa, VIIb, VIIc, VIIm and VIIj, in particular compounds of the formulae VIIa, VIIm and VIIj.

Very particular preference is given to compounds of the formula VIId in which $L^3$ is F and R is alkenyl having from 2 to 7 carbon atoms, in particular ethenyl or 1E-propenyl.

Preferred liquid-crystal mixtures comprise one or more compounds of component A, preferably in a proportion of from 15% to 80%, particularly preferably from 20% to 70%. These compounds have a dielectric anisotropy $\Delta\epsilon \geq +3$, in particular $\Delta\epsilon \geq +8$, particularly preferably $\Delta\epsilon \geq +12$.

Preferred liquid-crystal mixtures comprise one or more compounds of component B, preferably in a proportion of from 20 to 85%, particularly preferably in a proportion of from 30 to 75%. The compounds from group B, in particular those containing alkenyl groups, are distinguished, in particular, by their low values for the rotational viscosity $\gamma_1$.

Besides one or more compounds of the formula II, component B preferably comprises one or more compounds selected from the group consisting of the bicyclic compounds of the following formulae:
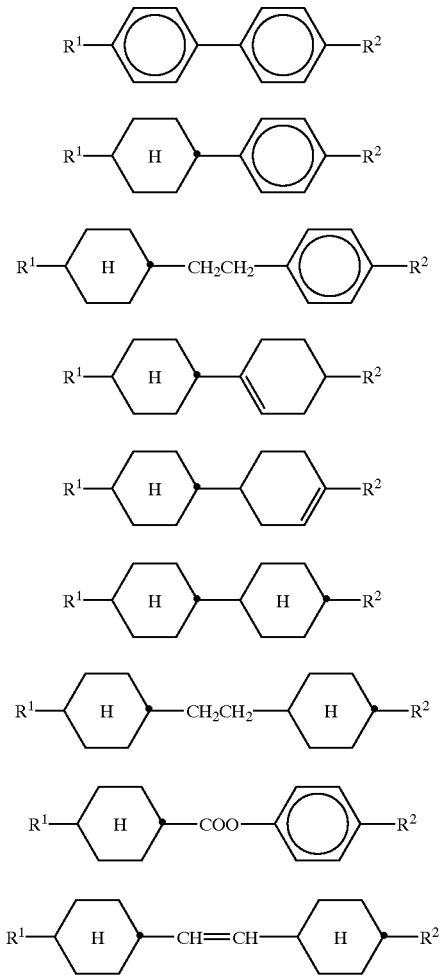
and/or one or more compounds selected from the group consisting of the tricyclic compounds of the following formulae:
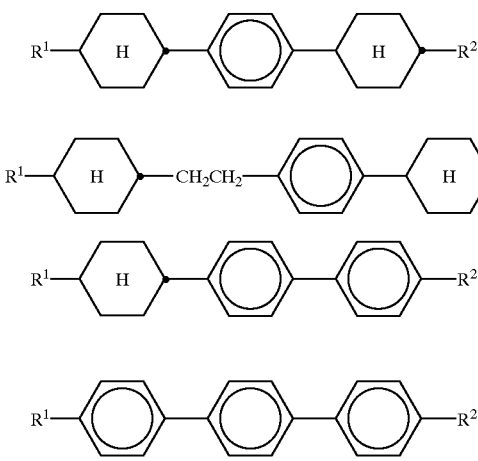
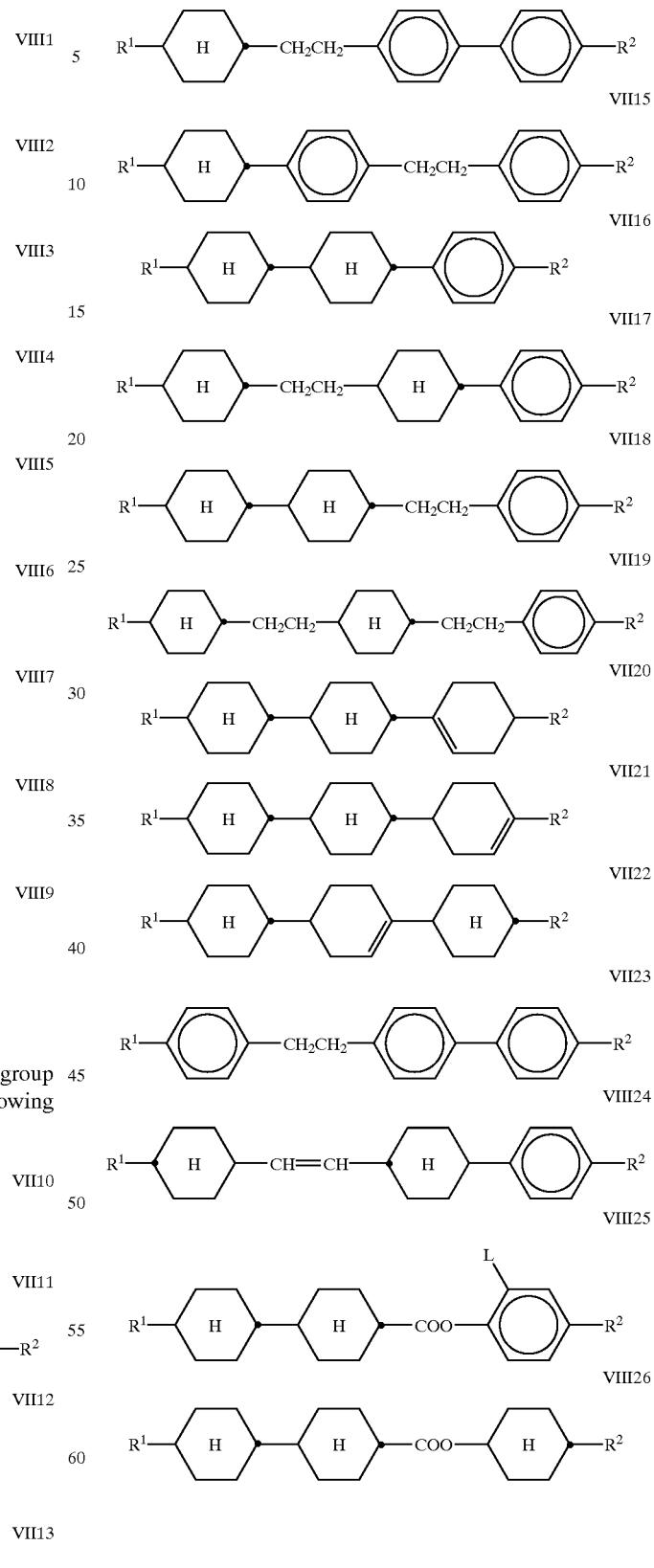
and/or one or more compounds selected from the group consisting of the tetracyclic compounds of the following formulae:

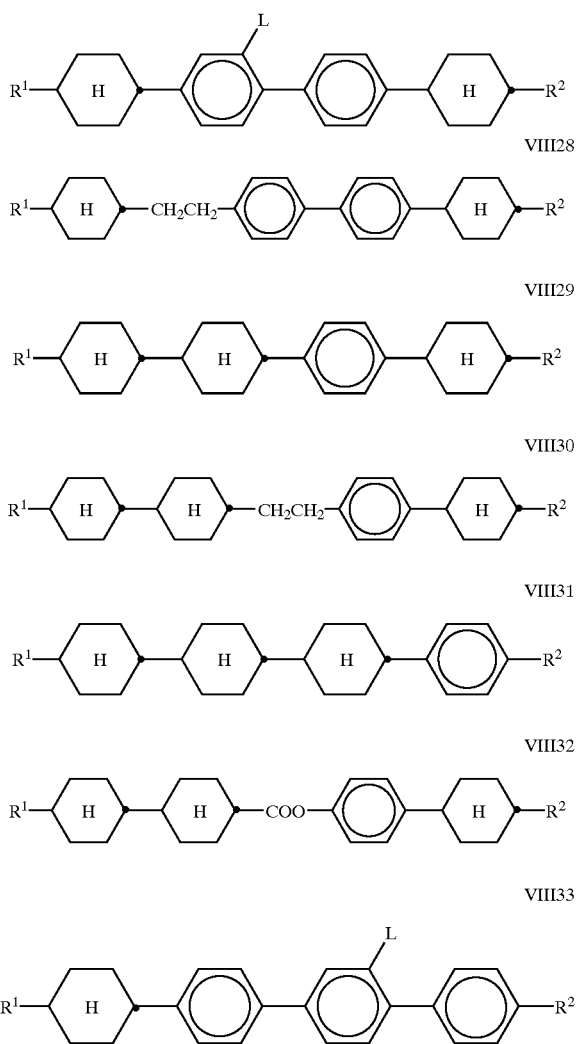

in which
R¹ and R² are each, independently of one another, an alkyl, alkoxy or alkenyl group having 1 to 12 carbon atoms, in which, in addition, one or two non-adjacent CH₂ groups may be replaced by —O—, —CH=CH—, —CO—, —OCO— or —COO— in such a way that O atoms are not linked directly to one another, and
L is H or F.

The 1,4-phenylene groups in VIII10 to VIII19 and VIII23 to VIII32 may each, independently of one another, also be monosubstituted or poly-substituted by fluorine.

Particular preference is given to compounds of the formulae VIII27 to VIII33 in which R¹ is alkyl and R² is alkyl or alkoxy, in particular alkoxy, in each case having 1 to 7 carbon atoms. Preference is furthermore given to compounds of the formulae IV25 and IV31 in which L is F.

Very particular preference is given to compounds of the formulae VIII2, VIII27 and VIII32.

The liquid-crystalline mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopants, some of which are commercially available, for example such as cholesteryl nonanoate, S-811 from Merck KGaA, Darmstadt, and CB15 (BDH, Poole, UK), is available to the person skilled in the art,. The choice of dopants is not crucial per se.

The proportion of the compounds of component C is preferably from 0 to 10%, in particular from 0 to 5%, particularly preferably from 0 to 3%.

Besides the compounds of the formulae I, II and III, the mixtures according to the invention preferably comprise one or more liquid-crystalline tolan compounds. Owing to the high birefringence Δn of the tolan compounds, lower layer thicknesses can be used, which significantly shortens the response times. The tolan compounds are preferably selected from the group consisting of the formulae Ta to Th:

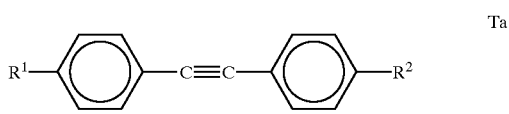

Ta

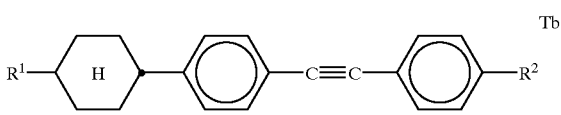

Tb

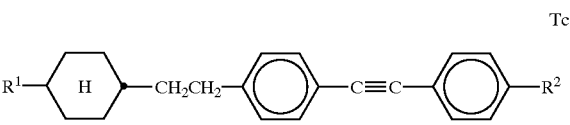

Tc

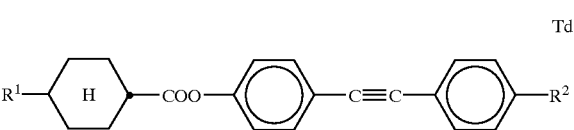

Td

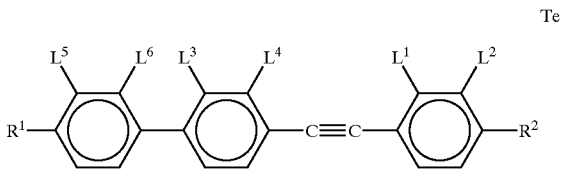

Te

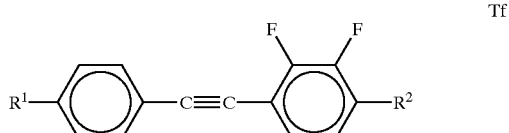

Tf

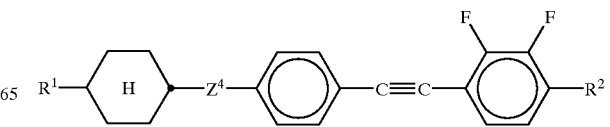

Tg

-continued

Th

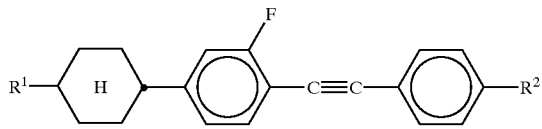

in which R¹ and R² are as defined above,

Z⁴ is —CO—O—, —CH₂CH₂— or a single bond, and

L¹ to L⁶ are each, independently of one another, H or F.

Particular preference is given to compounds of the formulae Ta and Tb, in particular those in which R² is an alkoxy group having from 1 to 12 carbon atoms.

Particularly preferred compounds of the formula Te are those in which one, two or three of the radicals L¹ to L⁶ are F and the others are H, where L¹ and L² or L³ and L⁴ or L⁵ and L⁶ are not simultaneously F.

The proportion of the compounds from the group comprising Ta and Tb is preferably from 5 to 50%, in particular from 10 to 40%.

The proportion of the compounds of the formulae Ta to Th is preferably from 2 to 55%, in particular from 5 to 35%.

The mixtures according to the invention may also optionally comprise up to 20% of one or more compounds having a dielectric anisotropy of below –2 (component D).

If the mixtures comprise compounds of component D, these are preferably one or more compounds containing the structural unit 2,3-difluoro-1,4-phenylene, for example compounds in accordance with DE-A 38 07 801, 38 07 861, 38 07 863, 38 07 864 or 38 07 908. Particular preference is given to tolans containing this structural unit in accordance with Inter-national Patent Application PCT/DE 88/00133.

Further known compounds of component D are, for example, derivatives of the 2,3-dicyanohydroquinones or cyclohexane derivatives containing the structural unit

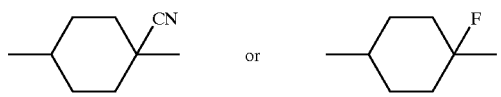

in accordance with DE-A 32 31 707 or DE-A 34 07 013.

The liquid-crystal displays according to the invention preferably contain no compounds of component D.

In the case of the meaning alkyl in the groups or substituents indicated above or below, in particular in R, R¹, R², R³, R⁴, R⁵, R⁶ and/or R⁷, the alkyl radical may be linear or branched. It preferably has 1, 2, 3, 4, 5, 6, 7 or 8 carbon atoms. It is preferably linear and is therefore in particular methyl, ethyl, propyl, butyl, pentyl, hexyl, heptyl or octyl.

In the case of the meaning alkoxy in the groups or substituents indicated above or below, in particular in R, R¹, R², R³, R⁴, R⁵, R⁶ and/or R⁷, the alkoxy radical may be linear or branched. It is preferably linear and has 1, 2, 3, 4, 5, 6, 7 or 8 carbon atoms and is therefore in particular methoxy, ethoxy, propoxy, butoxy, pentoxy, hexoxy, heptoxy or octoxy.

In the case of the meaning alkenyl in the groups or substituents indicated above or below, in particular in R, R¹, R², R³, R⁴, R⁵, R⁶ and/or R⁷, the alkenyl radical may be linear or branched. It is preferably linear and has 2, 3, 4, 5, 6, 7 or 8 carbon atoms. Particularly preferred alkenyl groups are $C_2$–$C_8$-1E-alkenyl, $C_4$–$C_8$-3E-alkenyl, $C_5$–$C_8$-4-alkenyl, $C_6$–$C_8$-5-alkenyl and $C_7$–$C_8$-6-alkenyl, in particular $C_2$–$C_8$-1E-alkenyl, $C_4$–$C_8$-3E-alkenyl and $C_5$–$C_8$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

In the case of the meaning alkenyloxy in the groups or substituents indicated above or below, in particular in R, R¹, R², R³, R⁴, R⁵, R⁶ and/or R⁷, the alkenyloxy radical may be linear or branched. It is preferably linear and has 2, 3, 4, 5, 6, 7 or 8 carbon atoms. Accordingly, it is in particular vinyloxy, prop-1- or -2-enyloxy, but-1-, -2- or -3-enyloxy, pent-1-, -2-, -3- or -4-enyloxy, hex-1-, -2-, -3-, -4- or -5-enyloxy, hept-1-, -2-, -3-, -4-, -5- or -6-enyloxy or oct-1-, -2-, -3-, -4-, -5-, -6- or -7-enyloxy.

The individual compounds of the formulae I, II, III, IV, V, VI, VII, VIII and T and their sub-formulae and also other compounds which can be used in the TN and STN displays according to the invention are either known or can be prepared analogously to the known compounds.

In particularly preferred embodiments, the mixtures comprise one, two or three compounds of the formula I, in particular those in which R¹ is an alkyl group having from 1 to 7 carbon atoms, and L¹ is F, from 2 to 50%, in particular from 5 to 30%, particularly preferably from 5 to 20%, of one or more compounds of the formula I, one, two or three compounds of the formula II, in particular those in which R² and R³ are an alkyl group having from 1 to 7 carbon atoms, from 2 to 50%, in particular from 3 to 30%, of one or more compounds of the formula II, one, two or three compounds of the formula III, in particular those in which R⁴ is an alkyl group having from 1 to 7 carbon atoms, and X and/or L² are F, from 2 to 50%, in particular from 3 to 20%, of one or more compounds of the formula III, from 5 to 60%, in particular from 12 to 50%, of one or more alkenyl compounds of the formula IV and/or IV*, at least one compound of the formula IVe and/or IVf, from 5 to 50%, in particular from 8 to 40%, of one or more compounds of the formula V, one or more, in particular one or two, compounds of the formula Vb, in particular those of the formula Vb-1, one or more, in particular one or two, compounds of the formula Vc, in particular those of the formula Vc-1, from 5 to 40%, in particular from 10 to 30%, of one or more compounds of the formula VII, one or more, in particular one, two or three, compounds of the formula VIId, from 2 to 40%, in particular from 3 to 30%, of one or more compounds of the formula VIII, one or more, in particular one, two or three, compounds of the formula VIII2, one or more, in particular one, two or three, compounds of the formula VIII27, one or more, in particular one, two or three, compounds of the formula VIII32, from 0.5 to 30%, in particular from 1 to 20%, of one or more compounds of the formula T, one or more, in particular one, two or three, compounds of each of the formulae Ta and/or Tb, preferably those in which $R^2$ is alkoxy having from 1 to 7 carbon atoms, more than 20% of compounds of positive dielectric anisotropy, in particular with $\Delta\epsilon \geq +12$.

The mixtures according to the invention are distinguished, in particular on use in TN and STN displays of high layer thicknesses, by very low total response times ($t_{tot}=t_{on}+t_{off}$).

The liquid-crystal mixtures used in the TN and STN cells according to the invention are dielectrically positive, with $\Delta\epsilon \geq 1$. Particular preference is given to liquid-crystal mixtures with $\Delta\epsilon \geq 3$, in particular with $\Delta\epsilon \geq 5$.

The liquid-crystal mixtures according to the invention have favorable values for the threshold voltage $V_{10/0/20}$ and for the rotational viscosity $\gamma_1$. If the value for the optical path difference d·$\Delta$n is pre-specified, the value for the layer thickness d is determined by the optical anisotropy $\Delta$n. In particular at relatively high values for d·$\Delta$n, the use of liquid-crystal mixtures according to the invention having a relatively high value for the optical anisotropy is generally preferred, since the value for d can then be selected to be relatively small, which results in more favorable values for the response times. However, liquid-crystal displays according to the invention which contain liquid-crystal mixtures according to the invention with smaller values for $\Delta$n are also characterized by advantageous values for the response times.

The liquid-crystal mixtures according to the invention are furthermore characterized by advantageous values for the steepness of the electro-optical characteristic line, and can be operated with high multiplex rates, in particular at temperatures above 20° C. In addition, the liquid-crystal mixtures according to the invention have high stability and favorable values for the electrical resistance and the frequency dependence of the threshold voltage. The liquid-crystal displays according to the invention have a large working-temperature range and good angle dependence of the contrast.

The construction of the liquid-crystal display elements according to the invention from polarizers, electrode base plates and electrodes having a surface treatment such that the preferential alignment (director) of the liquid-crystal molecules in each case adjacent thereto is usually twisted by a value of from 22.5° to 720° from one electrode to the other corresponds to the usual structure for display elements of this type. The term "usual structure" here is broadly drawn and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pre-tilt angles between the longitudinal axis of the molecules at the surface of the outer plates and the outer plates of from 0° to 7°, preferably from 0.010° to 5°, in particular from 0.1 to 2°. In the STN displays, the pre-tilt angle is from 1° to 30°, preferably from 1° to 12° and in particular from 3° to 10°.

The twist angle of the TN mixture in the cell has a value of between 22.5° and 170°, preferably between 45° and 130° and in particular between 80° and 115°. The twist angle of the STN mixture in the cell from alignment layer to alignment layer has a value of between 100° and 600°, preferably between 170° and 300° and in particular between 180° and 270°.

The liquid-crystal mixtures which can be used in accordance with the invention are prepared in a manner which is conventional per se. In general, the desired amount of the components used in lesser amount are dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives which are known to the person skilled in the art and are described in the literature. For example, 0–15% of pleochroic dyes may be added.

In the present application and in the examples below, the structures of the liquid-crystal compounds are indicated by means of acronyms, the transformation into chemical formulae taking place in accordance with Tables A and B. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is indicated. In individual cases, the acronym for the parent structure is followed, separated by a dash, by the code indicated in the table below for the substituents $R^1$, $R^2$, $L^1$, $L^2$ and $L^3$.

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $OC_nH_{2n+1}$ | $C_mH_{2m+1}$ | H | H | H |
| nO.m | $C_nH_{2n+1}$ | $OC_mH_{2m+1}$ | H | H | H |
| nN | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |

-continued

| Code for $R^1$, $R^2$, $L^1$, $L^2$, $L^3$ | $R^1$ | $R^2$ | $L^1$ | $L^2$ | $L^3$ |
|---|---|---|---|---|---|
| nmF | $C_nH_{2n+1}$ | $C_mH_{2m+1}$ | F | H | H |
| nOCF$_3$ | $C_nH_{2n+1}$ | OCF$_3$ | H | H | H |
| n-Vm | $C_nH_{2n+1}$ | —CH=CH—$C_mH_{2m+1}$ | H | H | H |
| nV-Vm | $C_nH_{2+1}$—CH=CH— | —CH=CH—$C_mH_{2m+1}$ | H | H | H |

The TN and STN displays preferably contain liquid-crystalline mixtures composed of one or more compounds from Tables A and B.

TABLE A ($L^1$, $L^2$, $L^3$ = H or F)

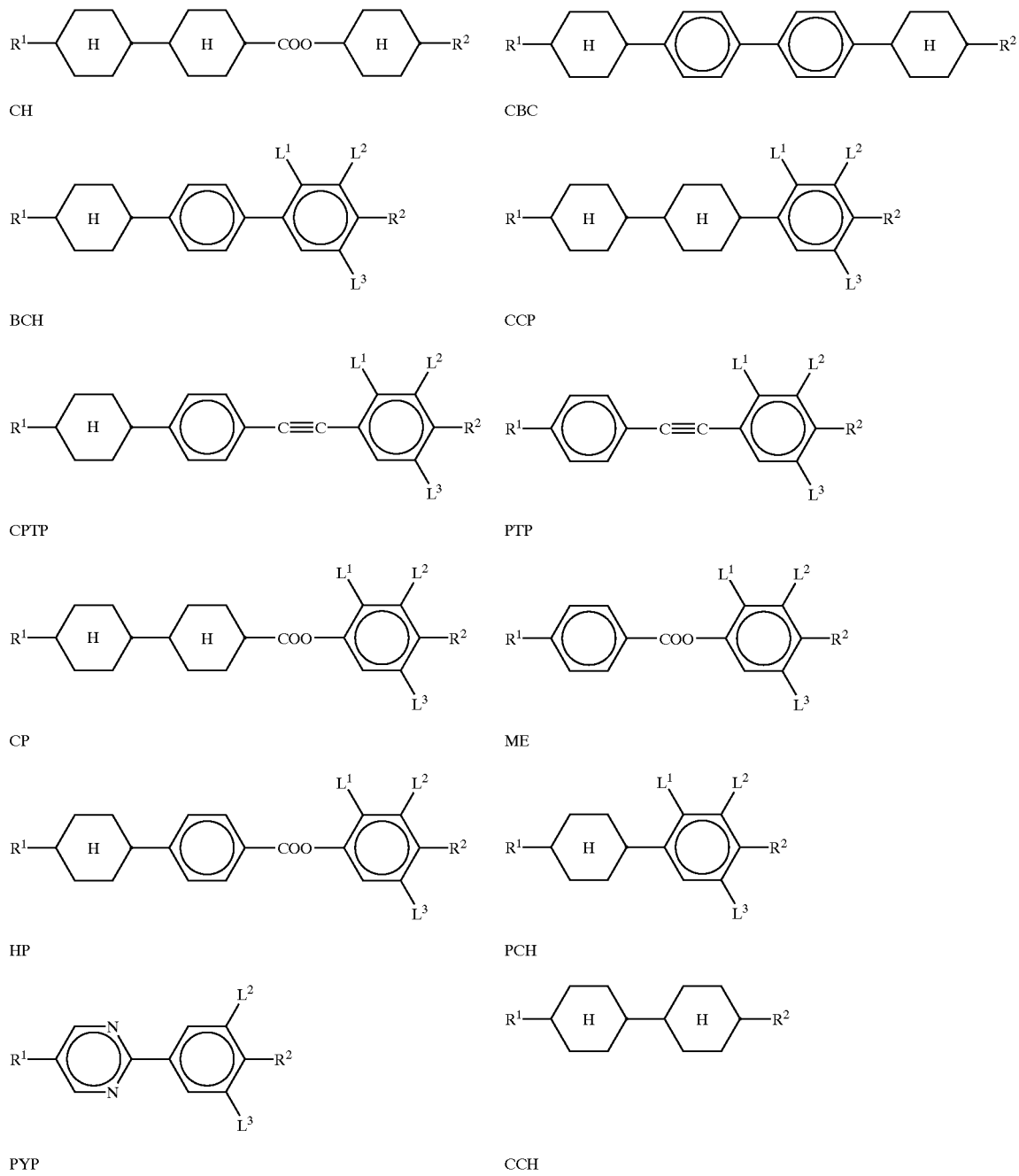

CH

CBC

BCH

CCP

CPTP

PTP

CP

ME

HP

PCH

PYP

CCH

TABLE A-continued
$(L^1, L^2, L^3 = H \text{ or } F)$
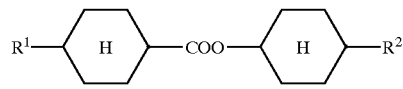
OS
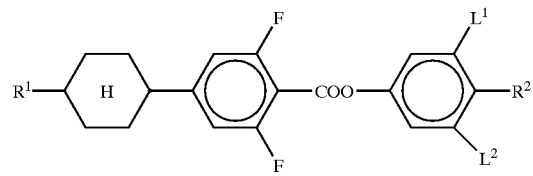
CUZP
TABLE B
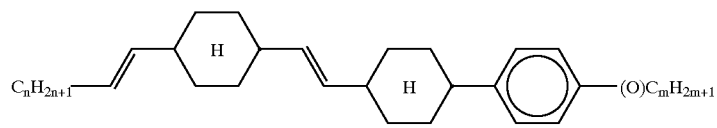
CVCP-nV-(O)m
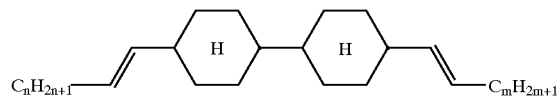
CC-nV-Vm
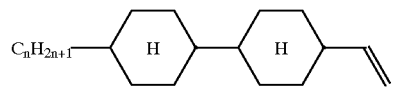
CC-n-V
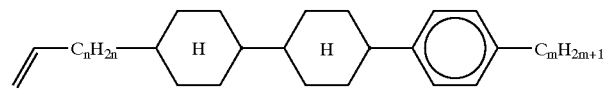
CCP-Vn-m
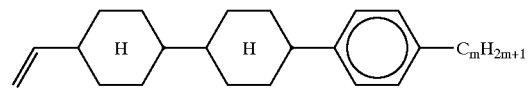
CCP-V-m
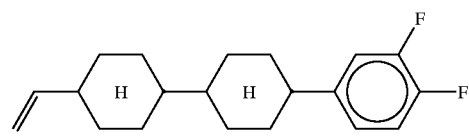
CCG-V-F
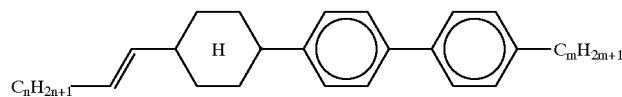
CPP-nV-m
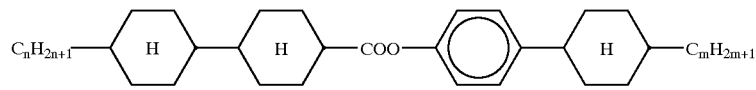
CCPC-nm TABLE B-continued

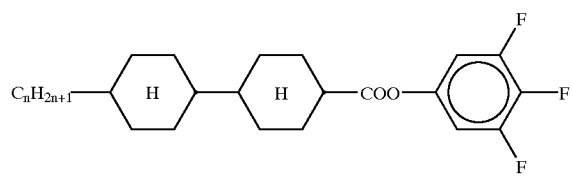

CCZU-n-F

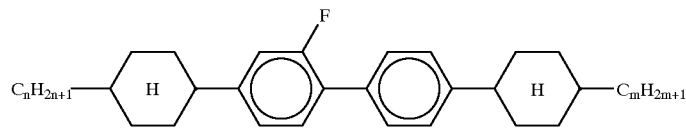

CBC-nmF

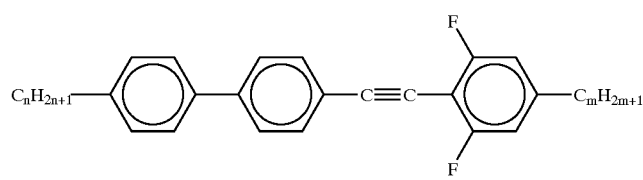

PPTUI-nm

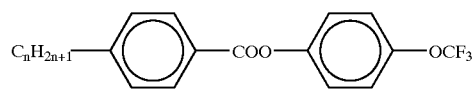

PZP-n-OT

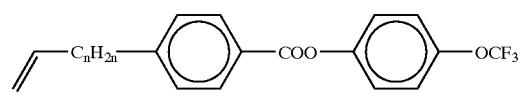

PZP-Vn-OT

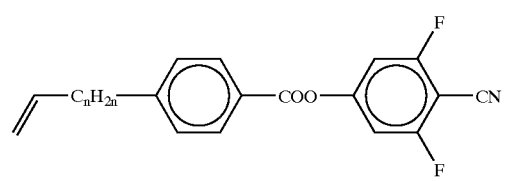

PZU-Vn-N

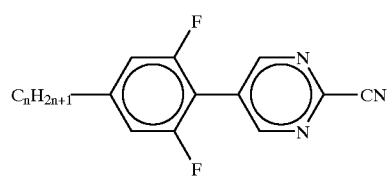

UM-n-N

In the following examples, the following abbreviations are used:
cl.p. clearing point (nematic-isotropic phase transition temperature),
$\Delta n$ optical anisotropy (589 nm, 20° C.)
$n_o$ ordinary refractive index (589 nm, 20° C.)
$\Delta \epsilon$ dielectric anisotropy (1 kHz, 20° C.)
S characteristic line steepness=$V_{90}/V_{10}$
$V_{op}$ operating voltage
$V_{10}$ threshold voltage=characteristic voltage at a relative contrast of 10%,
$V_{90}$ characteristic voltage at a relative contrast of 90%, $$t_{ave}\ \frac{t_{on}+t_{off}}{2}$$

(mean response time)

$t_{on}$ time from switching on until 90% of the maximum contrast is reached, $t_{off}$ time from switching off until 10% of the maximum contrast is reached, mux multiplex rate All values relate to 20° C., unless stated otherwise. The displays are addressed, unless stated otherwise, at a multiplex rate of 1/64 and a bias of 1/9. The twist is 240°, unless stated otherwise.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure[s] of all applications, patents and publications, cited above or below, and of corresponding German Application No. 10131238.5, filed Jun. 28, 2001, is hereby incorporated by reference.

EXAMPLE 1

A TN and STN mixture consisting of

| | | | |
|---|---|---|---|
| ME-2N.F | 4.00% | cl.p.: | 99.2° C. |
| ME-3N.F | 4.00% | Δn: | 0.1397 |
| ME-4N.F | 6.00% | $n_o$: | 1.4968 |
| ME-5N.F | 7.00% | $V_{10}$: | 1.36 V |
| PYP-3N.F.F | 12.00% | S: | 1.096 |
| CC-5-V | 23.00% | $t_{on} + t_{off}$ (−20° C.): | 4.0 s at 7.0 V and mux 32 |
| CCP-V-1 | 15.50% | $dV_{10}/dT$ | 1.1 mV/° C. (−20 to +70° C.) |
| PPTUI-3-2 | 6.50% | $dV_{op}/dT$ (mux 32) | 5 mV/° C. (−20 to +20° C.) |
| CCZU-3-F | 7.00% | $dV_{op}/dT$ (mux 32) | 2 mV/° C. (+20 to +70° C.) |
| CBC-33 | 5.00% | | |
| CBC-53 | 5.00% | | |
| CBC-55 | 5.00% | | | has significantly improved temperature dependence of the operating voltage $V_{op}$, in particular at low temperatures, and advantageously short response times, likewise at low temperatures.

EXAMPLE 2

A TN and STN mixture consisting of

| | | | |
|---|---|---|---|
| CH-33 | 2.00% | cl.p.: | 87.0° C. |
| CH-35 | 2.00% | Δn: | 0.1280 |
| CH-45 | 2.00% | Δε: | 31.3 |
| CCH-5O1 | 1.50% | $V_{10}$: | 1.1 V |
| CCH-3O3 | 5.00% | | |
| CC-5-V | 0.50% | | |

-continued

| | |
|---|---|
| CC-1V-V1 | 4.25% |
| CCG-V-F | 8.50% |
| CBC-33 | 2.50% |
| CCPC-34 | 2.50% |
| CCPC-33 | 5.25% |
| CCPC-35 | 5.00% |
| CUZP-2N.F.F | 2.50% |
| CUZP-3N.F.F | 2.00% |
| CUZP-5N.F.F | 2.50% |
| CCZU-3-F | 2.50% |
| CCZU-5-F | 3.00% |
| HP-4N.F | 3.00% |
| ME-2N.F | 2.50% |
| ME-3N.F | 2.50% |
| ME-4N.F | 8.00% |
| OS-33 | 3.00% |
| PCH-3N.F.F | 5.00% |
| PPTUI-3-2 | 3.50% |
| PYP-4 | 1.00% |
| PYP-5 | 1.00% |
| PYP-5F | 2.00% |
| PYP-3N.F.F | 7.00% |
| PYP-4N.F.F | 2.00% |
| PYP-5N.F.F | 2.00% |
| UM-3-N | 2.00% |
| UM-5-N | 2.00% |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. An STN liquid-crystal display having two outer plates, which, together with a frame, form a cell, a nematic liquid-crystal mixture of positive dielectric anisotropy located in the cell, electrode layers with alignment layers on the insides of the outer plates, a tilt angle between the longitudinal axis of the molecules at the surface of the outer plates and the outer plates of from 0 degree to 30 degrees, and a twist angle of the liquid-crystal mixture in the cell from alignment layer to alignment layer with a value of between 100° and 600°, a nematic liquid-crystal mixture comprising
  a) 15–80% by weight of a liquid-crystalline component A consisting of one or more compounds having a dielectric anisotropy of greater than +1.5;
  b) 20–85% by weight of a liquid-crystalline component B consisting of one or more compounds having a dielectric anisotropy of between −1.5 and +1.5;
  c) 0–20% by weight of a liquid-crystalline component D consisting of one or more compounds having a dielectric anisotropy of below −1.5, and
  d) optionally, an optically active component C in such an amount that the ratio between the layer thickness (separation of the outer plates) and the natural pitch of the chiral nematic liquid-crystal mixture is from about 0.2 to 1.3, wherein component A comprises at least one compound of formula I

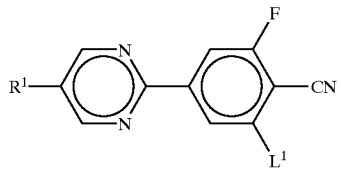

in which
R$^1$ is H or C$_{1-12}$-alkyl, in which, one or two non-adjacent CH$_2$ groups may be replaced by —O—, —CH=CH—, —CO—, —OCO— or —COO— in such a way that O atoms are not linked directly to one another, and
L$^1$ is H or F,
at least one compound of formula II

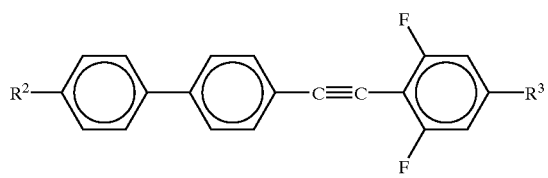

in which
R$^2$ and R$^3$ are each independently H, halogen, —CN, —NCS, —SF$_5$ or C$_{1-12}$-alkyl in which one or two non-adjacent CH$_2$ groups are optionally replaced by —O—, —CH=CH—, —CO—, —OCO— or —COO— in such a way that O atoms are not linked directly to one another, and one or more H atoms are optionally replaced by halogen and/or —CN,
and at least one compound of formula III

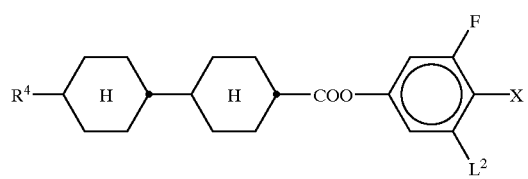

in which
R$^4$ is H or C$_{1-12}$-alkyl, in which, one or two non-adjacent CH$_2$ groups are optionally replaced by —O—, —CH=CH—, —CO—, —OCO— or —COO— in such a way that O atoms are not linked directly to one another,
X is —F, —Cl, —OCF$_3$, —OCHF$_2$, —OCHFCF$_3$ or —OCF$_2$CHFCF$_3$, and
L$^2$ is H or F.

2. A liquid-crystal display according to claim 1, wherein R$^1$, R$^2$, R$^3$ or R$^4$ are each independently alkyl, alkoxy, alkenyl or alkenyloxy of up to 12 carbon atoms.

3. A liquid-crystal display according to claim 1, further comprising at least one compound of formula IV

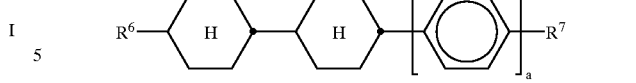

in which
R$^6$ is C$_{2-12}$-alkenyl, in which one or more H atoms is optionally replaced by halogen and/or —CN,
R$^7$ is H, halogen, —CN, —NCS, —SF$_5$ or C$_{1-12}$-alkyl, in which one or two non-adjacent CH$_2$ groups are optionally replaced by —O—, —CH=CH—, —CO—, —OCO— or —COO— in such a way that O atoms are not linked directly to one another, and in which one or more H atoms are optionally replaced by halogen and/or —CN, and
a is 0 or 1.

4. A liquid-crystal display according to claim 3, wherein R$^6$ is ethenyl or 1E-propenyl.

5. A liquid-crystal display according claim 1, further comprising one or more compounds of formula Vc

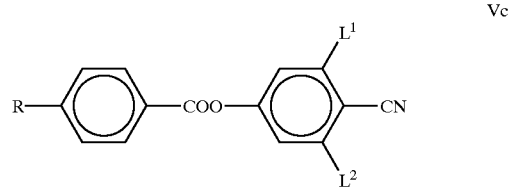

in which
R is an alkyl, alkoxy or alkenyl group of up to 12 carbon atoms, in which one or two non-adjacent CH$_2$ groups are optionally replaced by —O—, —CH=CH—, —CO—, —OCO— or —COO— in such a way that O atoms are not linked directly to one another, and
L$^1$ and L$^2$ are each independently H or F.

6. A liquid-crystal display according to claim 5, wherein R is C$_{1-12}$-alkyl, in which one or two non-adjacent CH$_2$ groups are optionally replaced by —O—, —CH=CH—, —CO—, —OCO— or —COO— in such a way that O atoms are not linked directly to one another,
L$^1$ is H, and
L$^2$ is F.

7. A liquid-crystal display according to claim 1, comprising 5 to 30% of one or more compounds of formula I.

8. A liquid-crystal display according to claim 1, comprising 3 to 30% of one or more compounds of formula II.

9. A liquid-crystal display according to claim 1, comprising 3 to 20% of one or more compounds of formula III.

10. A liquid-crystal mixture comprising
a) 15–80% by weight of a liquid-crystalline component A consisting of one or more compounds having a dielectric anisotropy of greater than +1.5;
b) 20–85% by weight of a liquid-crystalline component B consisting of one or more compounds having a dielectric anisotropy of between −1.5 and +1.5;
c) 0–20% by weight of a liquid-crystalline component D consisting of one or more compounds having a dielectric anisotropy of below −1.5, and
d) optionally, an optically active component C in such an amount that the ratio between the layer thickness (separation of the outer plates) and the natural pitch of the chiral nematic liquid-crystal mixture is from about 0.2 to 1.3,
wherein component A comprises at least one compound of formula I

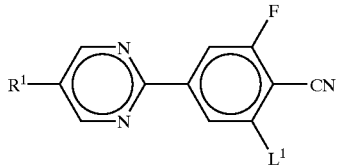

in which
R$^1$ is H or C$_{1-12}$-alkyl, in which, one or two non-adjacent CH$_2$ groups may be replaced by —O—, —CH=CH—, —CO—, —OCO— or —COO— in such a way that O atoms are not linked directly to one another, and
L$^1$ is H or F,
at least one compound of formula II

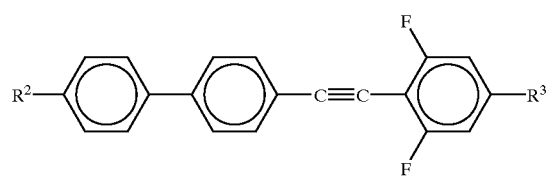

in which
R$^2$ and R$^3$ are each independently H, halogen, —CN, —NCS, —SF$_5$ or C$_{1-12}$-alkyl, in which one or two non-adjacent CH$_2$ groups are optionally replaced by —O—, —CH=CH—, —CO—, —OCO— or —COO— in such a way that O atoms are not linked directly to one another, and one or more H atoms are optionally replaced by halogen and/or —CN,
and at least one compound of formula III

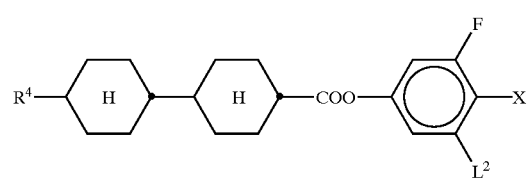

in which
R$^4$ is H or C$_{1-12}$-alkyl, in which, one or two non-adjacent CH$_2$ groups are optionally replaced by —O—, —CH=CH—, —CO—, —OCO— or —COO— in such a way that O atoms are not linked directly to one another,
X is —F, —Cl, —OCF$_3$, —OCHF$_2$, —OCHFCF$_3$ or —OCF$_2$CHFCF$_3$, and
L$^2$ is H or F.

11. A liquid-crystal mixture comprising at least one compound of formula I

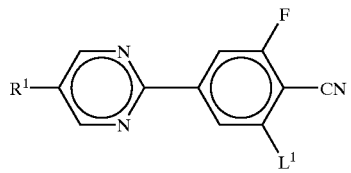

in which
R$^1$ is H or C$_{1-12}$-alkyl, in which, one or two non-adjacent CH$_2$ groups may be replaced by —O—, —CH=CH—, —CO—, —OCO— or —COO— in such a way that O atoms are not linked directly to one another, and
L$^1$ is H or F,
at least one compound of formula II

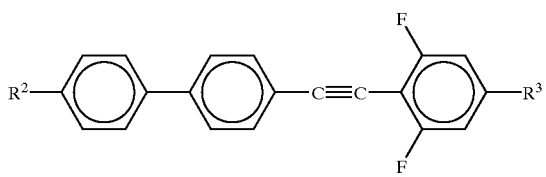

in which
R$^2$ and R$^3$ are each independently H, halogen, —CN, —NCS, —SF$_5$ or C$_{1-12}$-alkyl, in which one or two non-adjacent CH$_2$ groups are optionally replaced by —O—, —CH=CH—, —CO—, —OCO— or —COO— in such a way that O atoms are not linked directly to one another, and one or more H atoms are optionally replaced by halogen and/or —CN,
and at least one compound of formula III

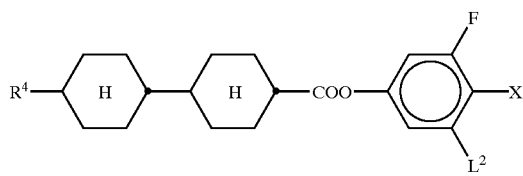

in which
R$^4$ is H or C$_{1-12}$-alkyl, in which one or two non-adjacent CH$_2$ groups are optionally replaced by —O—, —CH=CH—, —CO—, —OCO— or —COO— in such a way that O atoms are not linked directly to one another,
X is —F, —Cl, —OCF$_3$, —OCHF$_2$, —OCHFCF$_3$ or —OCF$_2$CHFCF$_3$, and
L$^2$ is H or F.

12. A liquid-crystal display comprising a mixture according to claim 10.

13. A liquid-crystal display comprising a mixture according to claim 11.

* * * * *